United States Patent
Hirayama

(10) Patent No.: US 6,961,828 B2
(45) Date of Patent: Nov. 1, 2005

(54) CLUSTER SYSTEM, MEMORY ACCESS CONTROL METHOD, AND RECORDING MEDIUM

(75) Inventor: Hideaki Hirayama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 09/944,097

(22) Filed: Sep. 4, 2001

(65) Prior Publication Data

US 2002/0133675 A1 Sep. 19, 2002

(30) Foreign Application Priority Data

Mar. 14, 2001 (JP) ........................ 2001-071680

(51) Int. Cl.⁷ .............................................. G06F 13/00
(52) U.S. Cl. .................. 711/150; 711/151; 711/152; 711/156; 711/141; 711/170; 710/200; 710/220; 710/244; 709/213
(58) Field of Search .............................. 711/150, 151, 711/152, 156, 141, 170, 159, 202; 710/200, 220, 244; 709/213

(56) References Cited

U.S. PATENT DOCUMENTS

| | | | | |
|---|---|---|---|---|
| 5,860,146 A | * | 1/1999 | Vishin et al. ................ | 711/207 |
| 5,918,229 A | * | 6/1999 | Davis et al. ................... | 707/10 |
| 6,338,112 B1 | * | 1/2002 | Wipfel et al. ................ | 710/269 |
| 6,353,898 B1 | * | 3/2002 | Wipfel et al. ................. | 714/48 |
| 6,647,468 B1 | * | 11/2003 | Woodward ................... | 711/147 |
| 2002/0144073 A1 | * | 10/2002 | Trainin et al. .............. | 711/170 |

FOREIGN PATENT DOCUMENTS

JP          2000-305832          11/2000

OTHER PUBLICATIONS

Shared Memory RAM Disk for a Cluster with Shared Memory, IBM Technical Disclosure Bulletin, Jun. 1993, vol. 36, Issue. 6B pp 299 –300.*

Preslan, K. W. et al., "Implementing Journaling in a Linux Shared Disk File System", Proceedings of the Eighth NASA Goddard Conference on Mass Storage Systems and Technologies in Cooperation with the Seventeenth IEEE Symposium on Mass Storage Systems.

* cited by examiner

Primary Examiner—Hong Kim
(74) Attorney, Agent, or Firm—Finnegan, Henderson, Farabow, Garrett & Dunner, L.L.P.

(57) ABSTRACT

Description of a parallel program is facilitated in a cluster system which loosely couples a plurality of server computers each having a cluster file system. In the cluster system, an application program is executed to generate a process. Using the cluster file system, the process maps a file recorded in a shared disk device to a cluster shared memory (distributed shared memory) area virtually provided in an address space arranged on main memory. By doing so, an access to files is processed as an access to main memory.

9 Claims, 9 Drawing Sheets

FIG. 4

| Cluster shared memory lock ID | Cluster file system lock ID |
|---|---|
| 18 | 1018 |
| | |
| | |
| | |

| Address | Size | File name | File descriptor | Offset |
|---|---|---|---|---|
| A | L | DDDD | 7 | 0 |
| | | | | |
| | | | | |
| | | | | |

| P4 | P2 | | |
|---|---|---|---|
| | | | |
| | | | |
| | | | |

119

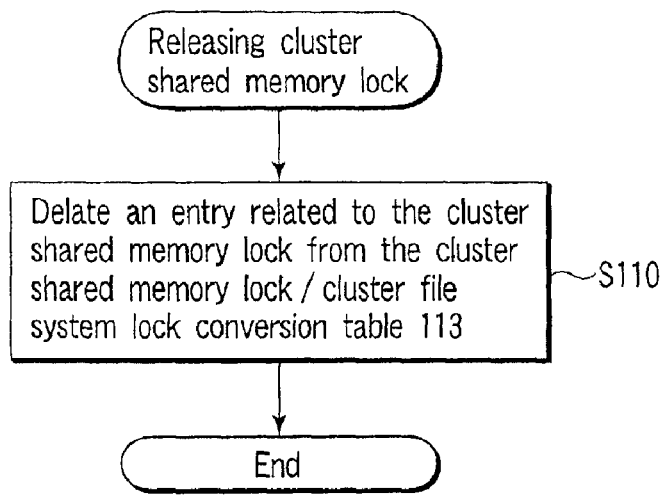
F I G. 11
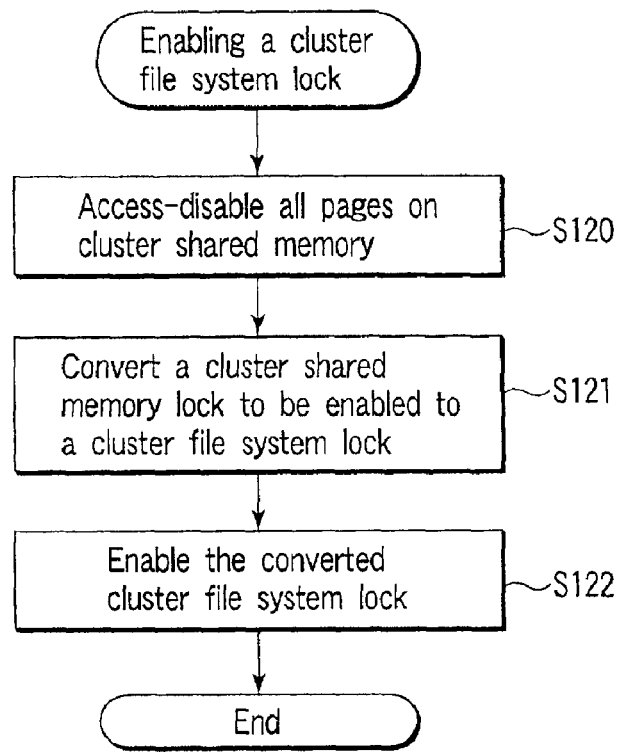
F I G. 12

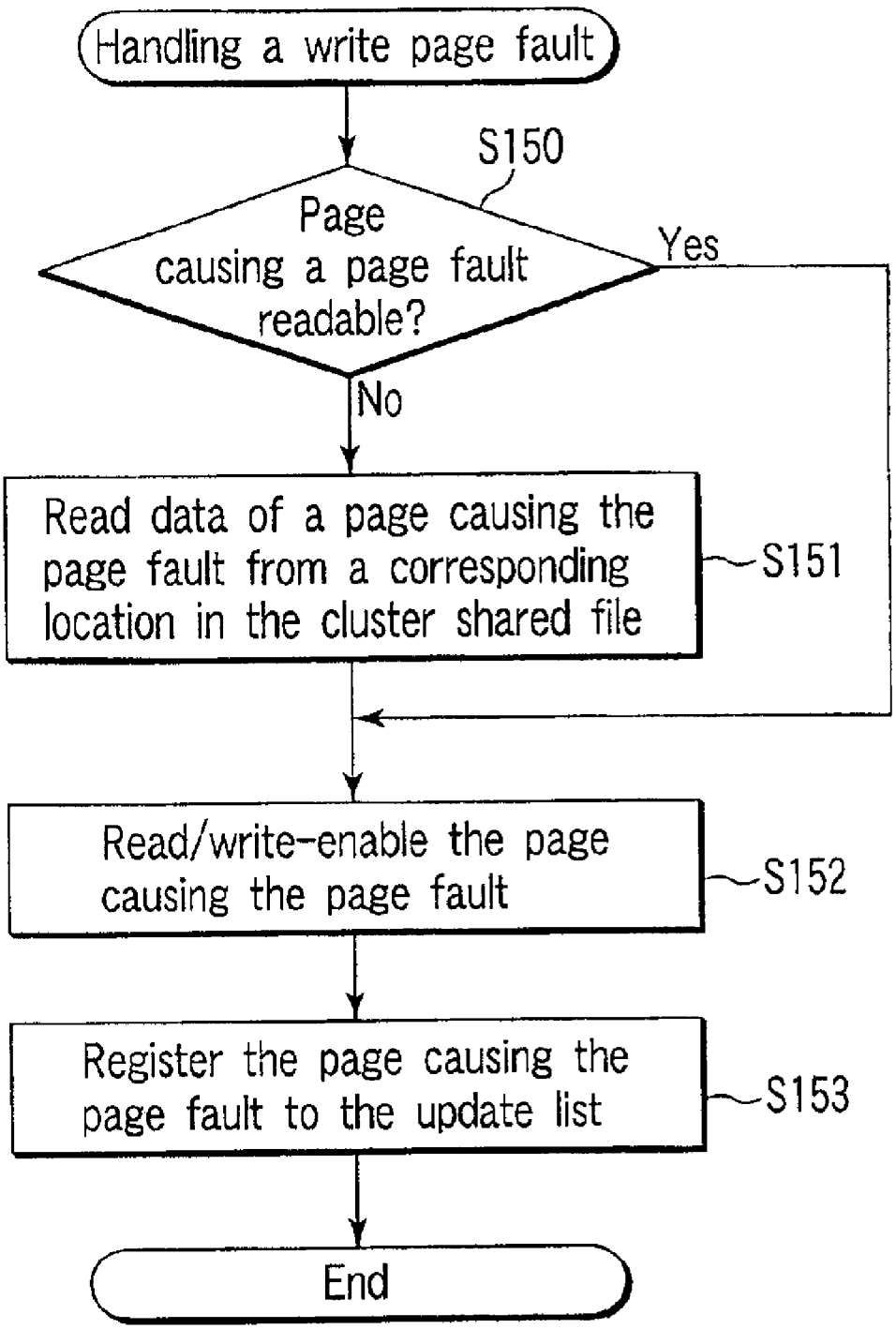
F I G. 15

CLUSTER SYSTEM, MEMORY ACCESS CONTROL METHOD, AND RECORDING MEDIUM

CROSS-REFERENCE TO RELATED APPLICATIONS

This application is based upon and claims the benefit of priority from the prior Japanese Patent Application No. 2001-071680, filed Mar. 14, 2001, the entire contents of which are incorporated herein by reference.

BACKGROUND OF THE INVENTION

1. Field of the Invention

The present invention relates to a cluster system, a memory access control method, and a recording medium for facilitating the parallel processing programming under a SAN (Storage Area Network) environment which uses a dedicated high-speed network for connection between a storage device and a computer.

2. Description of the Related Art

In recent years, attention is paid to a SAN which uses a dedicated high-speed network such as Fibre Channel to connect a computer (hereafter referred to as a server computer or just a server) with a magnetic disk device as a data storage device.

The SAN has the following advantages: (1) Capable of sharing a storage device among a plurality of severs; (2) Capable of separating an access load for the storage device from a LAN (Local Area Network); and (3) Capable of accelerating an access to the storage device. Of these, (1) is the general SAN advantage. Applying the cluster file system technology to this advantage enables not only to share the storage device among a plurality of server, but to have shared access to files.

A GFS (Global File System) developed by Sistina Software Inc. in the U.S. is an example of this cluster file system. The cluster file system allows shared access to a file stored in the storage device from a plurality of server computers.

Generally, an NFS (Network File System) is associated with shared access to a file from a plurality of server computers. However, the NFS does not ensure data consistency when a plurality of server computers update the same file. By contrast, the cluster file system ensures data consistency.

The cluster file system is provided with a cluster file system lock mechanism across a plurality of server computers for ensuring data consistency in addition to the shared access (read/write) function for files by a plurality of server computers. The cluster file system lock mechanism enables parallel application programs on a cluster system including a plurality of server computers.

For example, a cluster system is configured so that one magnetic disk device is connected to a plurality of server computers each having the cluster file system and the cluster file system lock mechanism through the intermediation of the SAN. This cluster system is loosely coupled without sharing main memory. A process running on each server computer uses the cluster file system to have shared access to a file stored in the magnetic disk device. Further, the process uses the cluster file system lock mechanism for exclusive access control, ensuring data consistency of files stored in the magnetic disk device.

By contrast, an SMP (Symmetrical Multiprocessor) parallel computer is provided with a file system, a shared memory system, and a lock mechanism, has a plurality of processors, and connects with, say, one magnetic disk device. A plurality of processes executed on this SMP-type parallel computer can each have shared access to a file stored in the magnetic disk device via the file system, or can access shared memory (main memory) via the shared memory system. A plurality of processes can maintain data consistency by providing exclusive access control during a shared access to files stored in the magnetic disk device or data stored in shared memory by means of the lock mechanism.

When comparing the conventional loosely-coupled cluster system with the SMP-type parallel computer, both can allow shared access to files stored in the magnetic disk device and maintain the data consistency.

However, the cluster system having the cluster file system can have shared access to files, but not to memory. Because of this, the cluster system having the cluster file system has a problem that it is difficult to use the parallel program for coding an application program to be executed.

Specifically, processes executed on a plurality of server computers are programmed to share files or data, ensure data consistency among each other, and synchronize data for data processing. Such programming needs to use memory for placing files or data to be processed by the processes in a shared manner, but this is impossible. When the process needs to process files or data synchronously in a shared manner by ensuring data consistency, the cluster file system needs to be used for placing files or data to be shared on a magnetic disk device. In this case, the process needs to be programmed by using an I/O command which uses an input/output device for processing files or data.

More complicated programming is needed when processing files or data stored in a file device (magnetic disk device) compared to when processing those stored in memory. A simple program using a load or store command can process data stored in memory.

When processing files or data stored in the magnetic disk device, however, it is necessary to code a program using complicated commands for I/O processing, making parallel program coding difficult. Compared to processing of data stored in memory, it takes time to process data stored in a file device (I/O device) such as a magnetic disk device, generating a problem of degrading a processing speed.

The cluster system loosely coupling a plurality of server computers provided with cluster file systems enables a shared access to files stored in a file device such as a magnetic disk device, but not a shared access to main memory. Compared with an SMP-type parallel computer, there arises a problem that coding with a parallel program is difficult.

Accordingly, there is a need to facilitate parallel program coding for the cluster system which loosely couples a plurality of server computers provided with cluster file systems.

BRIEF SUMMARY OF THE INVENTION

According to one aspect of the present invention, there is provided a cluster system comprising: a plurality of computers; a data storage device; a cluster file system providing exclusive control for maintaining data consistency by using a lock function in order to offer shared access to a file recorded on the data storage device from a process operating on the plurality of computers; cluster shared memory map means for allocating an area for shared memory in an address space of the process and for mapping data of files managed by the cluster file system in the area; and cluster shared memory lock allocation means for allocating the lock function of the cluster file system to the shared memory and enabling exclusive control for maintaining data consistency on the shared memory.

According to another aspect of the present invention, there is provided a memory access control method applied to a cluster system having a plurality of computers, a data storage device, and a cluster file system providing exclusive control for maintaining data consistency by means of a lock function in order to allow shared access from a process operating on the plurality of computers to a file recorded in the data storage device, the method comprising the steps of: allocating an area for shared memory in an address space of the process and mapping data of files managed by the cluster file system in the area; and allocating the lock function of the cluster file system to the shared memory and enabling exclusive control for maintaining data consistency on the shared memory.

According to yet another aspect of the present invention, there is provided a recording medium storing computer-executable program code for memory access control in a cluster system having a plurality of computers, a data storage device, and a cluster file system providing exclusive control for maintaining data consistency by means of a lock function in order to allow shared access from a process operating on the plurality of computers to a file recorded in the data storage device, the program code comprising: means for causing a computer to allocate an area for shared memory in an address space for the process and map data of a file managed by the cluster file system to the area; and means for causing a computer to allocate the lock function of the cluster file system to the shared memory and enable exclusive control for maintaining data consistency on the shared memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 details conversion tables for cluster shared memory locking and cluster file system locking;

FIG. 5 details conversion tables for cluster shared memory and a cluster shared file;

FIG. 6 details an update page list;

FIG. 11 is a flowchart showing a procedure for cluster shared memory unlocking by a cluster shared memory unlock section;

FIG. 12 is a flowchart showing a procedure for locking by a cluster shared memory locking section;

FIG. 15 is a flowchart showing a procedure by the cluster shared memory paging section when a write page fault occurs.

DETAILED DESCRIPTION OF THE INVENTION

An embodiment of the present invention will be described in further detail with reference to the accompanying drawings.

In this embodiment, an application program is executed in the cluster system to generate a process. The process uses the cluster file system to map files recorded in a shared disk device on cluster shared memory (distributed shared memory) areas virtually provided in an address space of main memory. Consequently, accessing a file is processed as accessing the address space. The above-mentioned cluster file system provides exclusive control so that a lock function can maintain data consistency for shared access to files recorded in the shared disk device from processes running on a plurality of computers.

Figure 1:
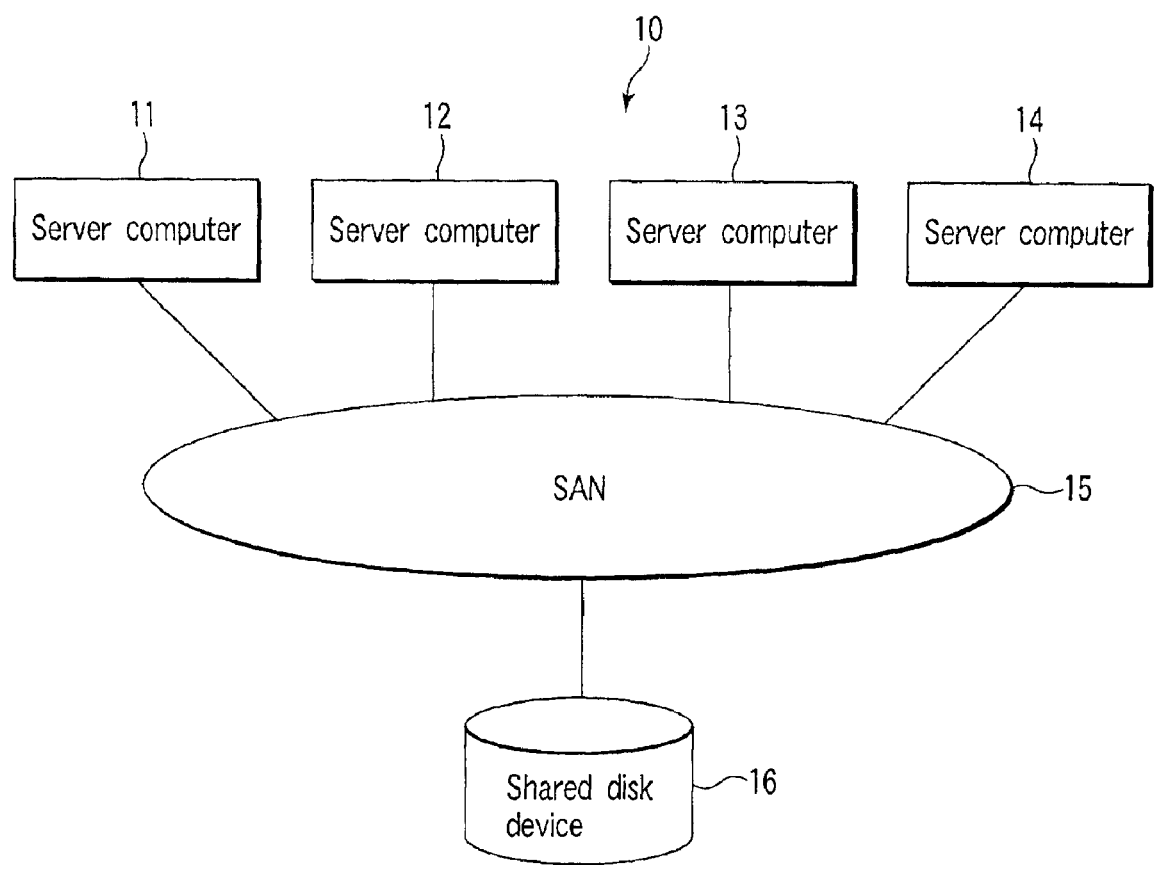
FIG. 1 shows a configuration of a cluster system according to an embodiment of the present invention.

FIG. 1 shows a configuration of a cluster system according to this embodiment.

In FIG. 1, a cluster system 10 includes a storage area network (SAN) 15 having Fibre Channel, server computers 11 to 14, and a shared disk device 16 having a magnetic disk device (hard disk drive). The SAN 15 connects with the server computers 11 to 14 and the shared disk device 16.

Figure 2:
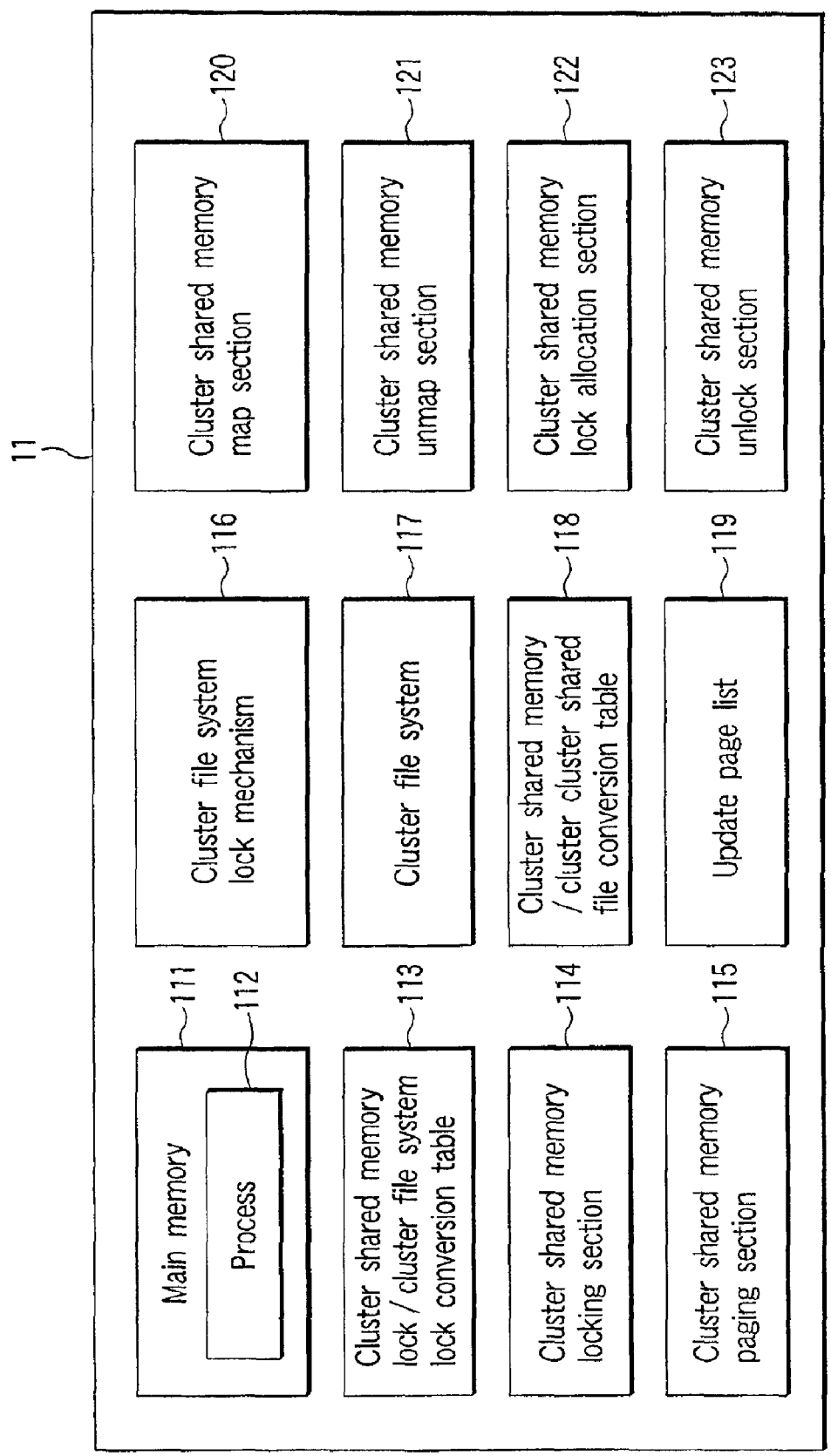
FIG. 2 shows a configuration of a server computer.

Each of server computers 11 to 14 is configured as shown in FIG. 2. This figure describes the server computer 11 as an example of server computers 11 to 14.

As shown in FIG. 2, the server computer 11 includes a main memory 111, a cluster shared memory lock or cluster file system lock conversion table 113, a cluster shared memory locking section 114, a cluster shared memory paging section 115, a cluster file system lock mechanism 116, a cluster file system 117, a cluster shared memory or cluster shared file conversion table 118, an update page list 119, a cluster shared memory map section 120, a cluster shared memory unmap section 121, a cluster shared memory lock allocation section 122, and a cluster shared memory unlock section 123.

The server computer 11 executes an application program to generate a process 112. This process has an address space and a context, and is executed by a processor (not shown).

Figure 3:
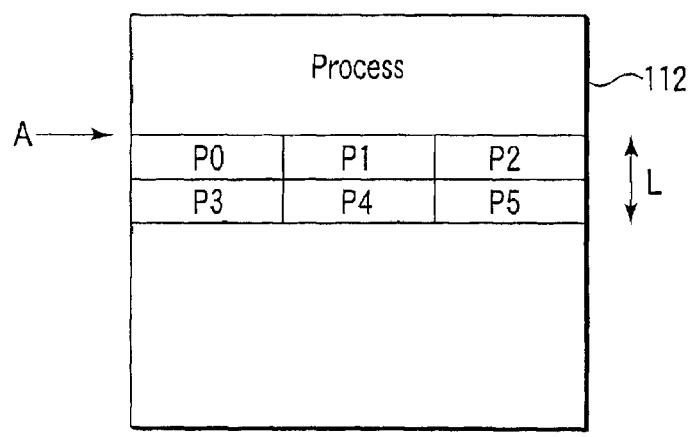
FIG. 3 details a process.

FIG. 3 details the process 112. A reference numeral A in FIG. 3 indicates an address in the address space for the process 112. The process 112 is provides with a plurality of pages P0, P1, P2, P3, P4, and P5 starting from address A within the range of size L. In this process 112, cluster shared memory is virtually provided.

As shown in FIG. 4, the cluster shared memory lock or cluster file system lock conversion table 113 contains a cluster shared memory lock ID column 113a and a cluster file system lock ID column 113b. A cluster shared memory lock ID and a cluster file system lock ID are registered to this cluster shared memory lock or cluster file system lock conversion table 113 for making correspondence between the both.

The cluster shared memory locking section 114 locks or unlocks exclusive control for ensuring data consistency stored in each page of the cluster shared memory.

The cluster shared memory paging section 115 stores or reads data from each page in the cluster shared memory.

The cluster file system 117 allows the server computers 11 to 14 to share files recorded in the shared disk device 16.

The cluster file system lock mechanism 116 locks or unlocks exclusive control for ensuring data consistency when the server computers 11 to 14 share files recorded in the shared disk device 16.

As shown in FIG. 5, the cluster shared memory/cluster shared file conversion table 118 contains an address column 118a, a size column 118b, a file name column 118c, a file descriptor 118d, and an offset column 118e. The cluster shared memory or cluster shared file conversion table 118 is used for correspondence (mapping) between a file recorded in the shared disk device 16 and the cluster shared memory.

The cluster shared memory map section 120 virtually provides cluster shared memory in the address space for the process 112.

The cluster shared memory unmap section 121 releases the cluster shared memory virtually provided in the address space for the process 112.

The cluster shared memory lock allocation section 122 allocates a cluster shared memory lock to a cluster file system lock both of which maintain one-to-one correspondence. The cluster shared memory lock allocation section 122 enables exclusive control for allocating the cluster file system's lock function to the cluster shared memory and ensuring data consistency on the relevant cluster shared memory.

The cluster shared memory unlock section 123 releases the cluster shared memory lock and the cluster file system lock allocated by the cluster shared memory lock allocation section 122.

FIG. 6 details the update page list 119. This list records a number of a page for the shared memory whose data is updated.

The following describes in detail operations when the process 112 executed on the server computer 11 accesses files recorded in the shared disk device 16.

Figure 7:
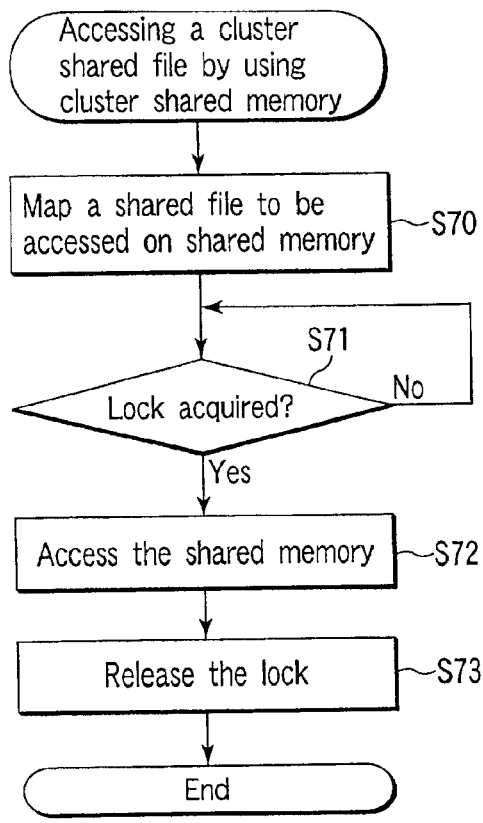
FIG. 7 is a flowchart showing a procedure for accessing a cluster shared file using cluster shared memory.

FIG. 7 is a flowchart showing a procedure for accessing a cluster shared file using the cluster shared memory. When the process 112 attempts to access a shared file recorded in the shared disk device 16, shared memory is virtually provided in the address space for the process 112. A shared file to be accessed is mapped on this shared memory (step S70). Specifically, the process 112 instructs the cluster shared memory map section 120 about cluster shared memory mapping. According to this instruction from the process 112, the cluster shared memory map section 120 maps the shared file to be accessed on the shared memory in the address space on the main memory 111 where the process 120 is placed.

Figure 8:
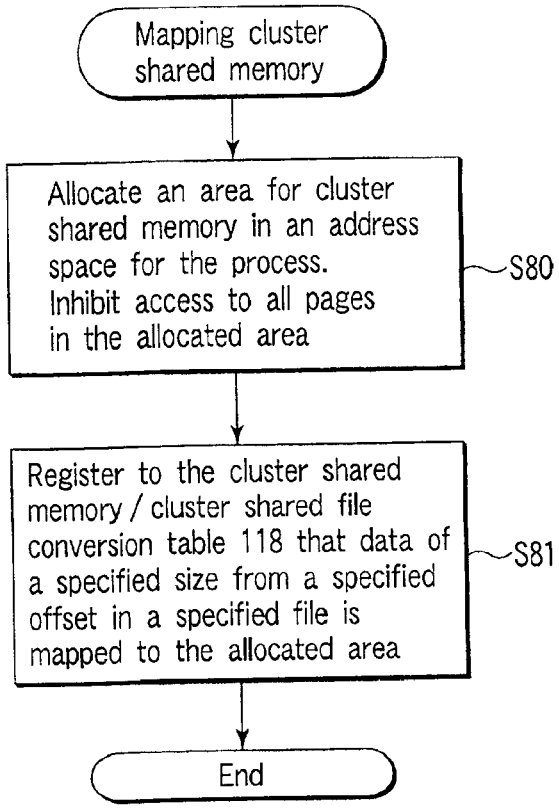
FIG. 8 is a flowchart showing an operational procedure for shared memory mapping by a cluster shared memory map section.

Here, a flowchart in FIG. 8 is used for explaining an operational procedure for shared memory mapping by the cluster shared memory map section 120. First, at step S80, an area for the cluster shared memory is allocated in the address space for the process 112, disabling an access to all pages in that area. An allocation is implemented by describing, e.g., C function malloc ( ) for the process 112.

The process 112 for the shared file to be accessed specifies an offset position. Data for a specified size from the specified offset position is mapped to the area allocated at step S80. This is registered to the cluster shared memory or cluster shared file conversion table 118 at step S81. As a registration result shown in FIG. 5, the file is registered within a range of size L from address A of the process 112 provided with the file name DDDD, the file descriptor 7, and the offset 0. Processing up to this step indicates that the process 112 has completed the environment for processing an access to the shared file as an access to the shared memory.

Referring back to FIG. 7, at step S71, the process 112 acquires a lock for exclusive access control needed to process an access to the shared file as an access to the shared memory. As preparations for lock acquisition, the process 112 instructs the cluster shared memory lock allocation section 122 about cluster shared memory lock allocation for correspondence between the cluster shared memory lock and the cluster shared file lock.

Figure 10:
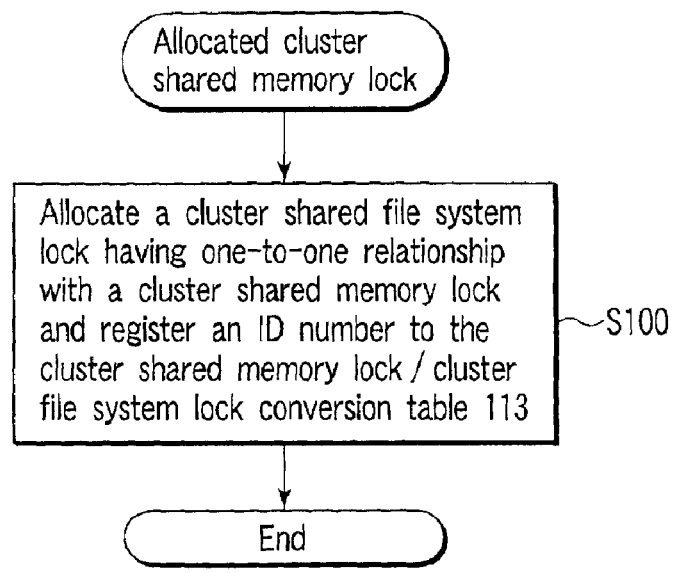
FIG. 10 is a flowchart showing an operational procedure for cluster shared memory lock allocation by a cluster shared memory lock allocation section.

FIG. 10 shows a flowchart showing an operational procedure for cluster shared memory lock allocation by the cluster shared memory lock allocation section 122. At step S100, a cluster shared memory lock ID number and a cluster file system lock ID number are correspondingly registered to the cluster shared memory lock or cluster file system lock conversion table 113 in FIG. 4. The purpose is to perform allocation for one-to-one correspondence between the cluster shared memory lock and the cluster file system lock.

To acquire a lock, the process 112 then instructs the cluster shared memory locking section 114 about lock acquisition. A flowchart in FIG. 12 is used to describe a procedure for locking by the cluster shared memory locking section 114 which received an instruction to acquire a lock.

At step S120, all pages on the cluster shared memory are access-disabled. At step S121, the cluster shared memory lock or cluster file system lock conversion table 113 in FIG. 4 is used to convert the cluster shared memory lock to be operated to a cluster file system lock. Then, at step S122, the cluster shared memory locking section 114 instructs the cluster file system lock mechanism 116 to operate the converted cluster file system lock for acquiring a lock.

Referring back to FIG. 7, when the lock acquisition succeeds at step S71, control proceeds to step S72. When the lock acquisition fails, another process already acquires a lock for the shared file as an entity by means of similar processing. In this case, no lock can be acquired. The process waits until the lock is released and is ready for acquisition, and then repeats processing at step S71.

At step S72, the process 112 instruct the cluster shared memory paging section 115 to execute a read access (executing a load command) or a write access (executing a store command) to the shared memory. When the cluster shared memory paging section 115 accesses the shared memory, a page fault occurs because no access is permitted for all pages in the shared memory. When the cluster shared memory paging section 115 issues a read access, a read page fault occurs. When the cluster shared memory paging section 115 issues a write access, a write page fault occurs.

Figure 14:
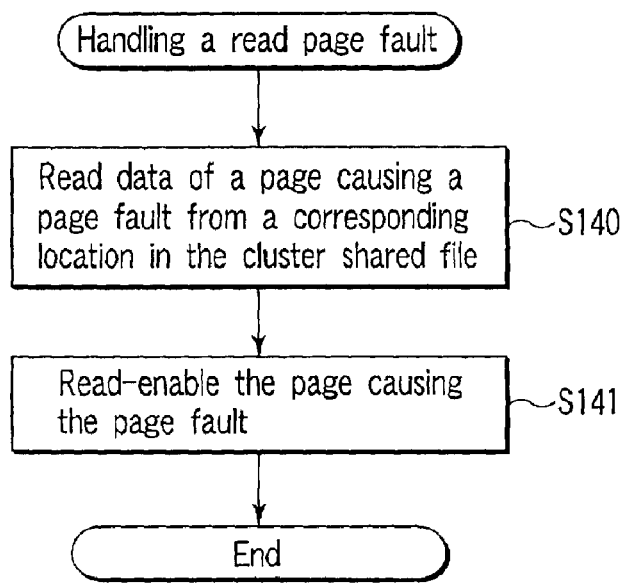
FIG. 14 is a flowchart showing a procedure by a cluster shared memory paging section when a read page fault occurs.

FIG. 14 shows a procedure by the cluster shared memory paging section 115 when a read page fault occurs. FIG. 15 shows a procedure by the cluster shared memory paging section 115 when a write page fault occurs.

FIG. 14 is referenced for explaining a procedure of the cluster shared memory paging section 115 when a read page fault occurs. At step S140, the cluster file system 117 reads data corresponding to the page data in the shared memory where the page fault occurred from the cluster shared file (the shared disk device 16) to the page in the relevant shared memory. At this time, data registered to the cluster shared memory or cluster shared file conversion table 118 is used for determining from which part of the cluster shared file the page data should be read. At step S141, the page where the page fault occurred is set to be readable.

Then, FIG. 15 is referenced for explaining a procedure of the cluster shared memory paging section 115 when a write page fault occurs. At step S150, the process determines whether the page where the page fault occurred is set to be readable. When the page is readable, the process proceeds to step S152, otherwise to step S151.

At step S151, the cluster file system 117 reads data corresponding to the page data in the shared memory where the page fault occurred from the cluster shared file (the shared disk device 16) to the page in the relevant shared memory. At this time, data registered to the cluster shared memory or cluster shared file conversion table 118 is used for determining from which part of the cluster shared file the page data should be read.

At step S152, the page where the page fault occurred is set to be readable and writable. Finally, at step S153, the process uses the update page list 119 to register a page number in the shared memory where the page fault occurred. After completing the page fault processing, the cluster shared memory paging section 115 actually accesses the cluster shared memory.

Referring back to FIG. 7, the shared memory is accessed at step S72. At step S73 to follow, the process 112 instructs the cluster shared memory locking section 114 to unlock the cluster shared memory lock for releasing the cluster shared memory lock.

Figure 13:
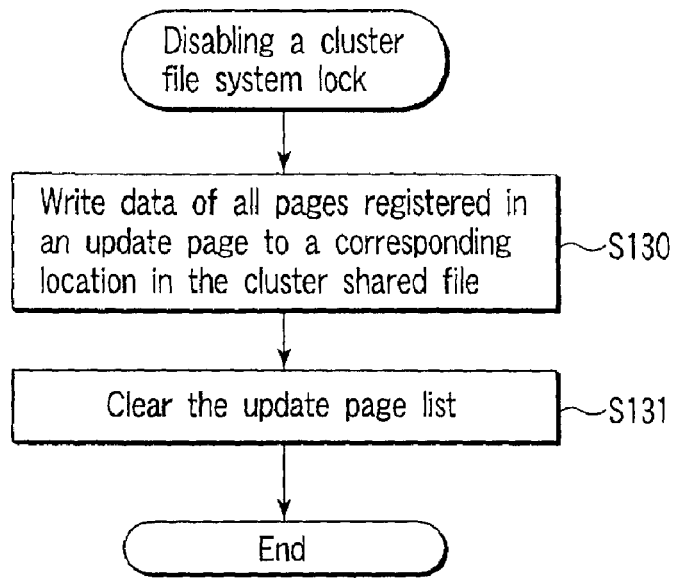
FIG. 13 is a flowchart showing an operational procedure for cluster shared memory unlocking by the cluster shared memory locking section.

Here, FIG. 13 is referenced for explaining a procedure of unlocking the cluster shared memory lock by the cluster shared memory locking section 114. FIG. 13 is a flowchart showing an operational procedure for cluster shared memory unlocking by the cluster shared memory locking section 114.

First at step S130, the cluster file system 117 writes all update page data contained in the update page list 119 in FIG. 6 to corresponding locations in the cluster shared file recorded in the shared disk device 16. At this time, the cluster shared memory or cluster shared file conversion table 118 is used to determine to which location of the cluster shared file an update page should be written. At step S131, the update page list 119 is cleared.

There has been described the procedure for accessing a cluster shared file using the cluster shared memory as shown in FIG. 7. The process 112 needs to leave entries undeleted in the cluster shared memory lock or cluster shared file lock conversion table 113 shown in FIG. 4 in order to still access the shared files accessed so far in the above description. When these entries remain available, the next lock can be acquired just by allowing the cluster shared memory locking section 114 to request the cluster file system lock mechanism 116 for file lock acquisition.

When the process 112 does not subsequently access the shared files accessed so far in the above description, the process 112 instructs the cluster shared memory unlock section 123 to release the cluster shared memory lock. FIG. 11 is a flowchart showing a procedure for cluster shared memory unlocking by the cluster shared memory unlock section 123. In FIG. 11, at step S110, entries concerning the cluster shared memory lock specified by the process 112 are deleted from the cluster shared memory lock or cluster file system lock conversion table 113 (see FIG. 4).

This releases the cluster shared memory lock.

Finally, the process 112 may complete access to all shared files to be processed as access to the shared memory. In this case, the process 112 instructs the cluster shared memory unmap section 121 to release mapping of the shared memory virtually specified in the address space. Namely, the cluster shared memory is unmapped.

Figure 9:
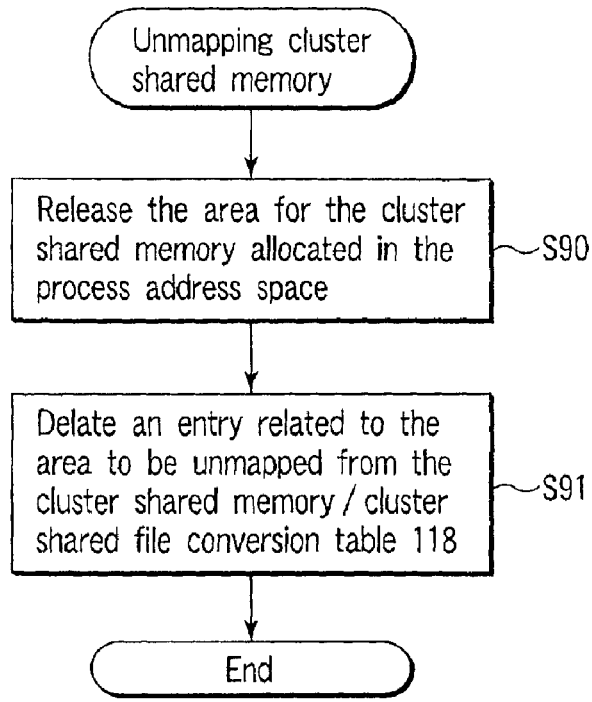
FIG. 9 is a flowchart showing a procedure for unmapping cluster shared memory by a cluster shared memory unmap section.

FIG. 9 is a flowchart showing a procedure for unmapping the cluster shared memory by the cluster shared memory unmap section 121. First, step S90 in FIG. 9 releases the area allocated in the address space for the process 112. Then, step S91 deletes the entries concerning the area to be unmapped from the cluster shared memory or cluster shared file conversion table 118 in FIG. 5.

Figure 16:
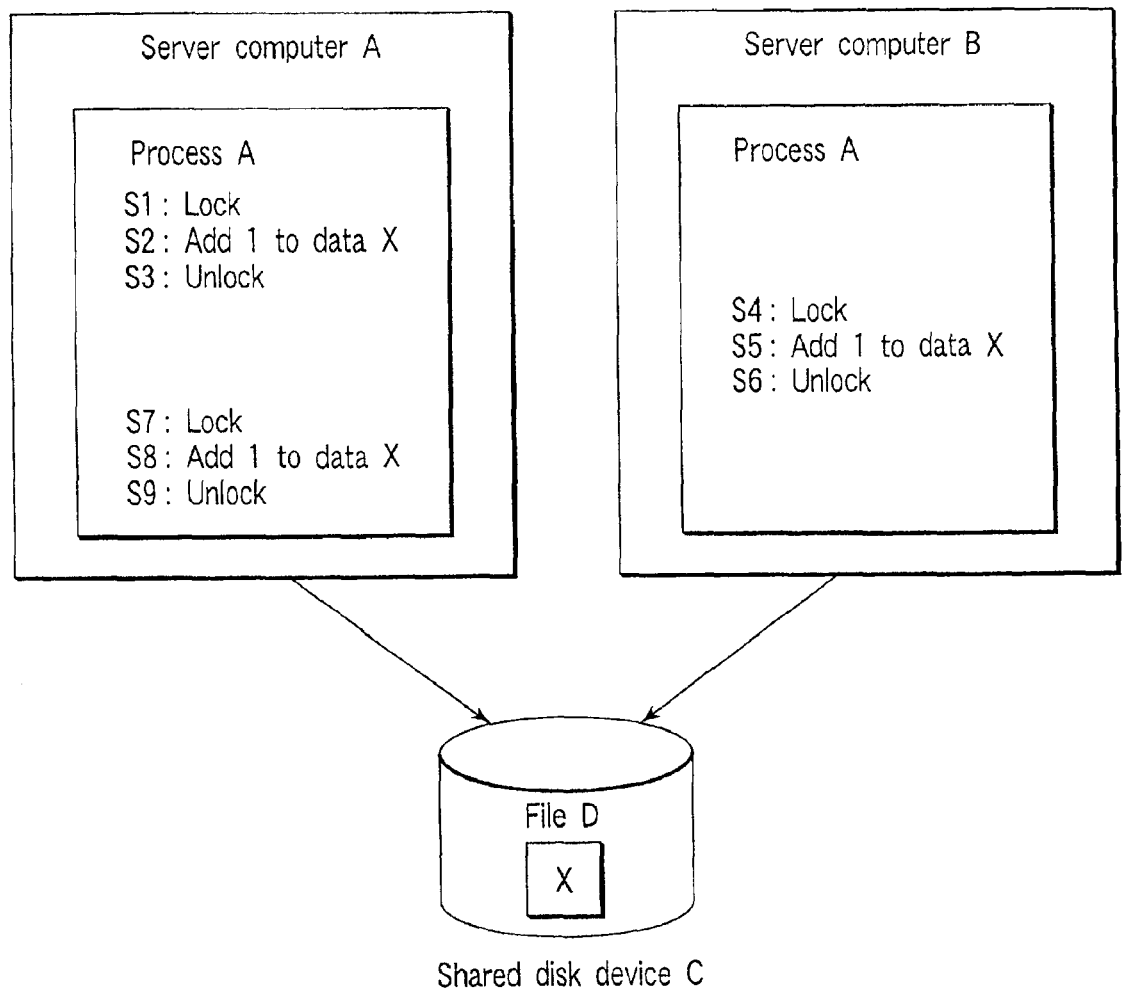
FIG. 16 shows a system configuration for describing operations when two server computers access the same file stored in a shared disk device.

FIG. 16 is used for describing operations when two server computers access the same file stored in a shared disk device. FIG. 16 diagrams a system configuration in which the cluster system includes server computers A and B, and a shared disk device C.

In FIG. 16, the server computers A and B are connected to the shared disk device C. A process A operates on the server computer A. A process B operates on the server computer B. The processes A and B each map a cluster shared file D in the address space of itself as mentioned above. The cluster shared file D is recorded in the shared disk device C managed in the cluster file system (not shown). The cluster shared file D contains a data area X.

Under this situation of setting, the process A executes steps S1 to S3. Then, the process B executes steps S4 to S6. Again, the process A executes steps S7 to S9. At step S1, the process A acquires a cluster shared memory lock, disabling access to all pages in an area where the cluster shared file D is mapped as the cluster shared memory. At step S2, an attempt is made to add a numeric value "1" to the data area X on the cluster shared memory, causing a write page fault. Since this area is unreadable, the cluster shared memory operation section reads the content of the page including this data area from the cluster shared file D.

This page is set to be readable and writable to terminate the page fault processing. After returning from the page fault, the process A adds 1 to the value for the data area X. At step S3, the cluster shared memory lock is released. Based on this, the cluster shared memory locking section writes the content of the page (to be updated) including the data area X back to the cluster shared file D. When the data area X is initialized to 0, its value is set to 1 at this point.

Then, the process B acquires the cluster shared memory lock at step S4. This disables access to all pages in the area which is used for mapping the cluster shared file D4 as the cluster shared memory. At step S5, an attempt is made to add a numeric value "1" to the data area X on the cluster shared memory, causing a write page fault. Since this area is unreadable, the cluster shared memory operation section reads the content of the page including this data area from the cluster shared file D. This page is set to be readable and writable to terminate the page fault processing. After returning from the page fault, the process B adds 1 to the value for the data area X. At step S6, the cluster shared memory lock is released. Based on this, the cluster shared memory locking section writes the content of the page (to be updated)

including the data area X back to the cluster shared file D. At this point, the data area X is set to value "2".

Finally, the process A acquires the cluster shared memory lock at step S7. This disables access to all pages in the area which is used for mapping the cluster shared file D as the cluster shared memory. At step S8, an attempt is made to add a numeric value "1" to the data area X on the cluster shared memory, causing a write page fault. Since this area is unreadable and writable, the cluster shared memory operation section reads the content of the page including this data area from the cluster shared file D. This page is set to be readable and writable to terminate the page fault processing. After returning from the page fault, the process A adds 1 to the value for the data area X. At step S9, the cluster shared memory lock is released. Based on this, the cluster shared memory locking section writes the content of the page (to be updated) including the data area X back to the cluster shared file D. At this point, the data area X is set to value "3".

As mentioned above in detail, the present invention enables shared access to files and memory in the cluster system having a cluster file system.

Further, the present invention can economically implement cluster shared memory by using a cluster file system. A cluster shared file is mapped as cluster shared memory, providing update data with durability. Moreover, the present invention uses the cluster file system to implement the cluster shared memory. Accordingly, a cluster shared file can be mapped as distributed shared memory, parallel executing memory-based access (load/store instruction) and file-based access (read/write system call).

The present invention is not limited to the above-mentioned embodiments. It is further understood by those skilled in the art that various changes and modifications may be made in the present invention without departing from the spirit and scope thereof.

For example, the above-mentioned embodiment has described the shared disk device 16 including the magnetic disk device as a data storage device for storing files in a shared manner. It may be preferable to use different data storage devices including other storage media than disks.

It may be preferable to store various processes for the above-mentioned embodiment according to the present invention as a computer program (code) on a computer-readable storage medium and to use a computer to read and execute the stored program. Such a computer program can be distributed by transferring from one computer to another via a communication medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cluster system comprising:
   a plurality of computers;
   a data storage device;
   a cluster file system providing exclusive control for maintaining data consistency by using a lock function in order to offer shared access to a file recorded on the data storage device from a process operating on the plurality of computers;
   means for allocating a memory area in an address space of the process as cluster shared memory and for mapping data of files managed by the cluster file system in the allocated area;
   means for allocating a cluster shared memory lock corresponding to the lock function of the cluster file system and enabling exclusive read and write access to the mapped data in the shared memory area for maintaining data consistency on the shared memory;
   access inhibit setting means for inhibiting access to all pages in the allocated shared memory;
   data accessing means, when accessing an access-inhibited page causes a read page fault, for reading the data mapped to the page from the file recorded on the data storage device and writing the read data on the page; and
   setting means for read-enabling the page where the data is accessed.

2. A cluster system comprising:
   a plurality of computers;
   a data storage device;
   a cluster file system providing exclusive control for maintaining data consistency by using a lock function in order to offer shared access to a file recorded on the data storage device from a process operating on the plurality of computers;
   means for allocating a memory area in an address space of the process as cluster shared memory and for mapping data of files managed by the cluster file system in the allocated area;
   means for allocating a cluster shared memory lock corresponding to the lock function of the cluster file system and enabling exclusive read and write access to the mapped data in the shared memory area for maintaining data consistency on the shared memory;
   access inhibit setting means for inhibiting access to all pages in the allocated shared memory;
   data write means, when accessing an access-inhibited page causes a write page fault, for reading the data mapped to the page from the file recorded on the data storage device and writing the read data on the page; and
   setting means for read-enabling and write-enabling the page where the data is written.

3. The cluster system according to claim 2, further comprising:
   means for acquiring a lock, when the cluster shared memory is locked, by access-inhibiting a page in a cluster shared memory area where a file managed by the cluster file system is mapped in the address space for the process; and
   means for writing data of an updated page in the cluster shared memory area back to a file managed by the cluster file system when the acquired lock is unlocked.

4. A memory access control method applied to a cluster system having a plurality of computers, a data storage device, and a cluster file system providing exclusive control for maintaining data consistency by means of a lock function in order to allow shared access from a process operating on the plurality of computers to a file recorded in the data storage device, the method comprising the steps of:
   allocating a memory area in an address space of the process as cluster shared memory and mapping data of files managed by the cluster file system in the allocated area;
   allocating a cluster shared memory lock corresponding to the lock function of the cluster file system and enabling exclusive read and write access to the mapped data in the shared memory area for maintaining data consistency on the shared memory;

inhibiting access to all pages in the allocated shared memory;

when accessing an access-inhibited page causes a read page fault, reading the data mapped to the page from the file recorded on the data storage device and writing the read data on the page; and read-enabling the page where the data is accessed.

5. A memory access control method applied to a cluster system having a plurality of computers, a data storage device, and a cluster file system providing exclusive control for maintaining data consistency by means of a lock function in order to allow shared access from a process operating on the plurality of computers to a file recorded in the data storage device, the method comprising the steps of:

allocating a memory area in an address space of the process as cluster shared memory and mapping data of files managed by the cluster file system in the allocated area;

allocating a cluster shared memory lock corresponding to the lock function of the cluster file system and enabling exclusive read and write access to the mapped data in the shared memory area for maintaining data consistency on the shared memory;

inhibiting access to all pages in the allocated shared memory;

when accessing the access-inhibited page causes a write page fault, reading the data mapped to the page from the file recorded on the data storage device and writing the read data on the page; and read-enabling and write-enabling the page where the data is written.

6. The memory access control method according to claim 5, further comprising the steps of:

acquiring a lock, when the cluster shared memory is locked, by access-inhibiting a page in a cluster shared memory area where a file managed by the cluster file system is mapped in the address space for the process; and writing data of an updated page in the cluster shared memory area back to a file managed by the cluster file system when the acquired lock is unlocked.

7. A recording medium storing computer-executable program code for memory access control in a cluster system having a plurality of computers, a data storage device, and a cluster file system providing exclusive control for maintaining data consistency by means of a lock function in order to allow shared access from a process operating on the plurality of computers to a file recorded in the data storage device, the program code comprising:

means for causing a computer to allocate a memory area in an address space for the process as cluster shared memory and map data of a file managed by the cluster file system to the allocated area;

means for causing a computer to allocate a cluster shared memory lock corresponding to the lock function of the cluster file system and enable exclusive read and write access to the mapped data in the shared memory area for maintaining data consistency on the shared memory;

means for causing a computer to inhibit access to all pages in the allocated shared memory;

means for causing, when accessing the access-inhibited page causes a read page fault, a computer to read the data mapped to the page from the file recorded on the data storage device and write the read data on the page; and means for causing a computer to read-enable the page where the data is accessed.

8. A recording medium storing computer-executable program code for memory access control in a cluster system having a plurality of computers, a data storage device, and a cluster file system providing exclusive control for maintaining data consistency by means of a lock function in order to allow shared access from a process operating on the plurality of computers to a file recorded in the data storage device, the program code comprising:

means for causing a computer to allocate a memory area in an address space for the process as cluster shared memory and map data of a file managed by the cluster file system to the allocated area;

means for causing a computer to allocate a cluster shared memory lock corresponding to the lock function of the cluster file system and enable exclusive read and write access to the mapped data in the shared memory area for maintaining data consistency on the shared memory;

means for causing a computer to inhibit access to all pages in the allocated shared memory;

means for causing, when accessing the access-inhibited page causes a write page fault, a computer to read the data mapped to the page from the file recorded on the data storage device and write the read data on the page; and means for causing a computer to read/write-enable the page where the data is written.

9. The recording medium according to claim 8, wherein the program code further comprises:

means for causing a computer to acquire a lock, when the cluster shared memory is locked, by access-inhibiting a page in a cluster shared memory area where a file managed by the cluster file system is mapped in the address space for the process; and means for causing a computer to write data of an updated page in the cluster shared memory area back to a file managed by the cluster file system when the acquired lock is unlocked.

* * * * *